United States Patent [19]

Vogelesang et al.

[11] Patent Number: 5,953,424
[45] Date of Patent: Sep. 14, 1999

[54] CRYPTOGRAPHIC SYSTEM AND PROTOCOL FOR ESTABLISHING SECURE AUTHENTICATED REMOTE ACCESS

[75] Inventors: A. Ian Vogelesang, Sunnyvale; Carl V. Claunch, Los Altos, both of Calif.

[73] Assignee: Hitachi Data Systems Corporation, Santa Clara, Calif.

[21] Appl. No.: 08/820,153

[22] Filed: Mar. 18, 1997

[51] Int. Cl.[6] .............................. H04L 9/32; H04L 9/08
[52] U.S. Cl. ............................. 380/25; 380/9; 380/21; 380/23; 380/29; 380/30; 380/49
[58] Field of Search .............................. 380/4, 9, 23, 25, 380/30, 49, 50, 59, 21, 44, 45, 29

[56] References Cited

U.S. PATENT DOCUMENTS

| | | |
|---|---|---|
| 4,200,770 | 4/1980 | Hellman et al. . |
| 5,148,479 | 9/1992 | Bird et al. ................................. 380/23 |
| 5,153,919 | 10/1992 | Reeds, III et al. ........................ 380/44 |
| 5,172,414 | 12/1992 | Reeds, III et al. ........................ 380/45 |
| 5,204,902 | 4/1993 | Reeds, III et al. ........................ 380/23 |
| 5,241,599 | 8/1993 | Bellovin et al. . |
| 5,369,705 | 11/1994 | Bird et al. ................................. 380/21 |
| 5,469,507 | 11/1995 | Canetti et al. ............................ 380/30 |
| 5,590,198 | 12/1996 | Lee et al. ................................. 380/21 |
| 5,708,714 | 1/1998 | Lopez et al. ............................. 380/25 |

*Primary Examiner*—Bernarr E. Gregory
*Attorney, Agent, or Firm*—Gallagher & Lathrop; David N. Lathrop

[57] ABSTRACT

A cryptographic protocol establishes shared secrets such as encryption/decryption keys by exchanging public signals generated from transformations of private signals and one or more authentication factors including "what you know," "what you have" and "what you are" factors. A novel use of the authentication factors provides resistance against various types of cryptanalysis including dictionary attacks and man-in-the-middle attacks, allows detection of prior occurrences of unauthorized parties successfully masquerading as an authorized party, and provides enhanced security in cryptosystems that rely on "what you know" authentication factors such as passwords which are often weak in a cryptographic sense.

28 Claims, 4 Drawing Sheets

CRYPTOGRAPHIC SYSTEM AND PROTOCOL FOR ESTABLISHING SECURE AUTHENTICATED REMOTE ACCESS

FIELD OF THE INVENTION

The invention relates to cryptographic systems and protocols and more particularly to cryptographic systems and protocols for establishing secure remote access to computer systems using public-signal key-establishment protocols.

DESCRIPTION OF RELATED ART

With the growing popularity of the Internet, there is a growing need to offer secure remote access to secure systems across public communications channels. People using portable computers from many locations such as a hotel, an airport, or a customer's office wish to make private connections with secure systems using insecure communication links such as the Internet. Messages exchanged in this manner may be subject to scrutiny by unauthorized parties and may even be subject to attempts by unauthorized parties to alter such messages being exchanged.

A secure exchange of information can be achieved over insecure communication links using "cryptosystems" in which the private information content or "plaintext" of a message is first converted to "ciphertext" by a process called "encryption" which proceeds according to a value called an "encryption key." The ciphertext message is transmitted by way of "public signals" over the insecure network to the receiving party. The receiving party recovers the original private information content or plaintext from the ciphertext message by a process called "decryption" which proceeds according to a value called a "decryption key."

As used herein, the terms "public" and "private" are relative terms. Access to "private" information and signals is generally more restricted than is access to "public" information and signals. Private information need not be completely private and public information need not be completely public. The measures taken to restrict access and the degree of restriction varies considerably with the nature and perceived value of the information and the nature of the application using the information.

The term "cryptosystem" as used herein refers to a collection of the set of plaintext values, the set of ciphertext values, the set of encryption key values, the set of decryption key values, the encryption function which maps pairs of plaintext and encryption key values to ciphertext values, and the decryption function which maps pairs of ciphertext and decryption key values to plaintext values.

The encryption key and the decryption key are identical in "symmetric-key" cryptosystems but are not identical in "asymmetric-key" cryptosystems. Symmetric-key cryptosystems are generally used for bulk encryption of plaintext because fewer computational resources are required to perform encryption and decryption in symmetric-key cryptosystems than are generally required in asymmetric-key cryptosystems. An example of an asymmetric-key cryptosystem is the Rivest-Shamir-Adelman (RSA) public-key/private-key method. Two examples of symmetric-key cryptosystems are the Data Encryption Standard (DES) and the International Data Encryption Algorithm (IDEA). Variants of DES such as "Triple-DES" have been developed because of increasing concerns regarding the feasibility to mount a brute force attack against DES cryptosystems by trying all $2^{56}$ possible key values.

Throughout this disclosure, more particular mention is made of symmetric-key cryptosystems because this type of system is usually more practical for bulk encryption and decryption; however, many of the principles discussed herein are pertinent to either type of cryptosystem. For ease of discussion, the encryption and decryption keys used in a particular cryptosystem are referred to herein as "encryption/decryption keys" for both symmetric-key and asymmetric-key systems. Where appropriate, distinctions between the two types of systems are discussed.

Various types of attacks on cryptosystems known collectively as "cryptanalysis" attempt to recover encryption/decryption keys or plaintext by examining ciphertext with or without some knowledge of the corresponding plaintext. One type of attack, mentioned above as a "brute force" attack, merely tries decrypting ciphertext using all possible values of the decryption key. Other types of attacks attempt to increase the efficiency of the cryptanalysis by exploiting mathematical or statistical properties of the cryptosystem, including known characteristics of the encryption function, the plaintext or the encryption/decryption keys. The feasibility of exploiting these properties to obtain information about the original plaintext or the encryption key by examining, for example, ciphertext encrypted using a single encryption key increases as the amount of such ciphertext available for examination increases. These types of attack are possible when the ciphertext is conveyed over insecure transmission channels, permitting public scrutiny of the ciphertext.

One technique that can be used to reduce the vulnerability of a cryptosystem to cryptanalysis is to use unique encryption/decryption keys for each communication session established between two parties. The encryption/decryption keys that are unique to a communication session are referred to herein as a "session key." In situations where a communications session may remain active for transmission of extended quantities of data, it is an established practice to change the session key at intervals. The use of session keys can also reduce the amount of private information subject to exposure to unauthorized parties should a decryption key for a particular session be revealed by any means or should plaintext be determined by cryptanalysis.

At the time a communications session is established, the parties wishing to participate in the session may perform a series of steps or a "protocol" by which messages are exchanged to communicate information necessary for each participating party to establish a "shared secret" value from which the session key is derived and/or which permits each participating party to authenticate or verify the identity of the other participating parties. To be effective, the protocol must prevent the shared secret from being established by any unauthorized party even though the messages being exchanged may be subject to scrutiny by outside observers. Such protocols are referred to herein as "public-signal key-establishment" protocols.

The term "shared" used herein refers to information like encryption/decryption keys or parameters that are available collectively to authorized parties. A "shared secret," for example, refers to information that is available to authorized parties but is not readily available to unauthorized parties. For information like symmetric keys, the term refers to information that is truly shared; however, for information like a set of asymmetric keys, the information is not common to all participants but is shared in a communal sense. Stated differently, after a group of authorized parties collectively establish a shared secret, for example, each authorized party may have access to the entire secret or may have access to only part of the secret.

One example of a public-signal key-establishment protocol is the "Diffie-Hellman" protocol, described in U.S. Pat.

No. 4,200,770 and referred to therein as a "public key distribution protocol. According to this protocol, each participating party possesses a "secret signal," which is not generally known or available to other parties, and performs a transformation of his or her respective secret signal; all parties participating in the protocol exchange the public signals resulting from the transformation of their respective secret signals, and each participating party obtains a common shared secret by transforming again his or her own secret signal with the public signals received from all other parties.

The transformation uses common parameters agreed to in advance by all parties. The common parameters and operations of the transformation need not be secret. The transformation is infeasible to invert, meaning that the computational and memory resources required to derive a party's secret signal from the signal resulting from the transformation that is sent to other parties, even if the common parameters and transformation operations are known, are so great that it is essentially impossible to invert the transformation.

A cryptosystem that uses protocols such as the Diffie-Hellman protocol to establish session keys is vulnerable to another type of attack referred to herein as a "man-in-the-middle" attack. In this type of attack, an unauthorized party M intercepts and manipulates messages passed between two authorized parties, A and B. By masquerading as party B, party M participates in a protocol with party A to establish a session key $K_A$ for a communication session that party A believes has been established with party B. Similarly, by masquerading as party A, party M participates in a protocol with party B to establish a session key $K_B$ for a communication session that party B believes has been established with party A. From this intermediate position, party M can receive ciphertext from party A, recover the plaintext using session key $K_A$, encrypt the recovered plaintext or encrypt some other plaintext using session key $K_B$ and send the resulting ciphertext to party B. Messages from party B can be intercepted and passed along to party A in a similar manner. In this situation, party M is able to obtain the plaintext exchanged between parties A and B and/or substitute plaintext and neither party A nor party B is able to detect the presence of party M.

One protocol that reduces vulnerability to man-in-the-middle attacks is the "Bellovin-Merritt" protocol described in U.S. Pat. No. 5,241,599. According to this protocol, at least one of the first two messages exchanged between two parties is encrypted and decrypted using a password as the encryption/decryption keys. In a first embodiment, the plaintext of the first message is the public key of a public-key/private-key cryptosystem. In a second embodiment, the plaintext of the first message is the individual public signal of a public-key distribution protocol like the Diffie-Hellman protocol. The second message conveys either a random value encrypted using the public key or the other party's individual public signal in the first and second embodiments, respectively.

In many protocols, the security gained by using passwords or other information known to a participant, referred to herein as "what you know" authentication factors, is often compromised because the people who use them often choose factors that are cryptographically weak, meaning that they can be guessed or discovered after a reasonable number of attempts. For example, people often choose passwords that are valid words in their language, are names or birthdates of a close relative, are addresses, etc. A cryptanalytic technique for guessing these kinds of choices is referred to herein as a "dictionary" attack because the guesses are drawn from a dictionary or other list of candidates. An "on-line" dictionary attack requires the participation of an authorized party to test guesses. An "off-line" dictionary attack does not require such participation.

In the Bellovin-Merritt protocol, active participation of an authorized party is required to test guesses; therefore, off-line attacks are not possible. Furthermore, the vulnerability to an on-line dictionary attack is greatly reduced because the content of either message that is encrypted using the "what you know" factor is random, making it much more difficult to recognize when the "what you know" factor has been guessed correctly. This resistance to man-in-the-middle attacks is not without cost. The cost is an increase in resources required to perform the encryption and decryption using the "what you know" factor.

If the "what you know" authentication factor is divulged or otherwise discovered, the Bellovin-Merritt protocol is no longer resistant to man-in-the-middle attacks. Furthermore, once informed of the "what you know" authentication factor, an unauthorized party can successfully mount a man-in-the-middle attack without detection because the protocol does not provide a way to detect such an occurrence.

In addition to the problems discussed above, the growing use of portable computers is causing an increasingly common problem that is not addressed by known protocols. A portable computer is often used in insecure environments like hotel rooms or airport lounges where access to the computer is possible, especially at times when the computer is not under the direct supervision of the authorized user. Having gained access to the computer, an unauthorized party can attempt to copy information stored in the computer or steal the computer itself. Having done either, the unauthorized party would then have access to the stored information content unless it is protected by some means. Security measures based on controlling access to the information through the ability to start or "boot" an operating system can often be defeated easily. For example, the disk storing the information can be removed from the computer and installed in another device having the means to recover the stored information. The confidentiality of the information can be preserved, however, if the information is stored in an encrypted form, provided the encryption function and the encryption/decryption keys are sufficiently resistant to cryptanalysis.

Unfortunately, even if the information has been encrypted, it is quite likely that the encryption/decryption keys are derived from "what you know" information that is subject to a dictionary attack or is recorded somewhere, possibly on materials kept with the computer or stored in the computer itself. In either case, having gained access to the computer, the unauthorized person is probably able to recover the stored information content.

BRIEF SUMMARY OF THE INVENTION

It is an object of the present invention to provide for an improved public-signal key-establishment protocol.

One advantage achieved by the present invention is the ability to resist man-in-the middle attacks using a variety of authentication factors including "what you know" factors without imposing the costs of encrypting and decrypting messages passed in the protocol.

Another advantage is the ability to detect instances where an unauthorized party has obtained the authentication factors and successfully masqueraded as an authorized party in a communication session believed to be secure by all other parties.

Yet another advantage is the ability to render infeasible an off-line dictionary attack on a "what you know" authentication factor, even if the "what you know" authentication factor is fairly easy to guess and any other required authentication factors are disclosed.

A further advantage is the ability to provide cryptographically strong encryption/decryption keys to an authorized party for unilaterally encrypting and decrypting information.

Other advantages achieved by the present invention are discussed throughout this disclosure.

In a cryptographic protocol for a first participant and one or more second participants according to one aspect of the present invention, the first participant establishes a shared secret with the second participants by receiving a private signal, generating a first public signal in response thereto by obtaining an initial transformation of the private signal using shared parameters shared with the second participants, wherein the initial transformation is infeasible to invert, receiving a respective second public signal from each of the second participants, sending the first public signal to at least one of the second participants, and generating a shared-secret signal representing the shared secret by obtaining a combining transformation of the private signal with the second public signals and a first authentication factor shared with the second participants using the shared parameters, wherein the combining transformation is such that the generation of the shared-secret signal is infeasible having access to only the first public signal, all of the second public signals, the first authentication factor and the common parameters, i.e., without access to the private signal, and is such that distinct values of the shared-secret signal can be generated by varying only the first authentication factor.

In a cryptographic protocol for a plurality of participants according to another aspect of the present invention, a first participant establishes a shared secret with a second participant by the first participant receiving a first private signal, the second participant receiving a second private signal, the first participant generating a first public signal by obtaining a first initial transformation of the first private signal using shared parameters, wherein the first initial transformation is infeasible to invert, the second participant generating a second public signal by obtaining a second initial transformation of the second private signal using the shared parameters, wherein the second initial transformation is infeasible to invert, the first participant receiving the second public signal, the second participant receiving the first public signal, the first participant generating a first shared-secret signal representing the shared secret by obtaining a first combining transformation of the first private signal with the second public signal and a first authentication factor using the shared parameters, wherein the first combining transformation is such that the generation of the first shared-secret signal is infeasible having access to a first set including only the first public signal, the second public signal, the first authentication factor and the shared parameters, i.e., without access to the first private signal, and is such that distinct values of the first shared-secret signal can be generated by varying only the first authentication factor, and the second participant generating a second shared-secret signal representing the shared secret by obtaining a second combining transformation of the second private signal with the first public signal and the first authentication factor using the shared parameters, wherein the second combining transformation is such that the generation of the second shared-secret signal is infeasible having access to a second set including only the first public signal, the second public signal, the first authentication factor and the shared parameters, i.e., without having access to the second private signal, and is such that distinct values of the second shared-secret signal can be generated by varying only the first authentication factor.

In a cryptographic protocol for a first participant and a second participant according to yet another aspect of the present invention, the second participant is able to detect a prior occurrence of an unauthorized party masquerading as the first participant by the first participant generating one or more signals in response to a first retained token in possession of the first participant, the second participant receiving the signals and authenticating the first participant by verifying the signals with a second retained token in possession of the second participant, the second participant generating a first notification signal and updating the second retained token in response to a successful verification of the signals, and restricting future communications with the first participant in response to an unsuccessful verification of the signals, and the first participant receiving the first notification signal and, in response thereto, updating the first retained token so as to permit successful verification in future communications with the second retained token as updated by the second participant.

In a cryptographic protocol for a first participant and a second participant according to a further aspect of the present invention, wherein the first participant and the second participant share an authentication factor, the first participant obtains a decryption key by the first participant generating one or more signals in response to the authentication factor, the second participant receiving the signals and, in response thereto, authenticating the first participant using the authentication factor, the second participant generating a message in response to a key value associated with the first participant, the first participant receiving the message and deriving the decryption key in response thereto, and the first participant using the decryption key to decrypt information stored on a computer for use on that computer.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

DETAILED DESCRIPTION OF THE INVENTION

Figure 1:
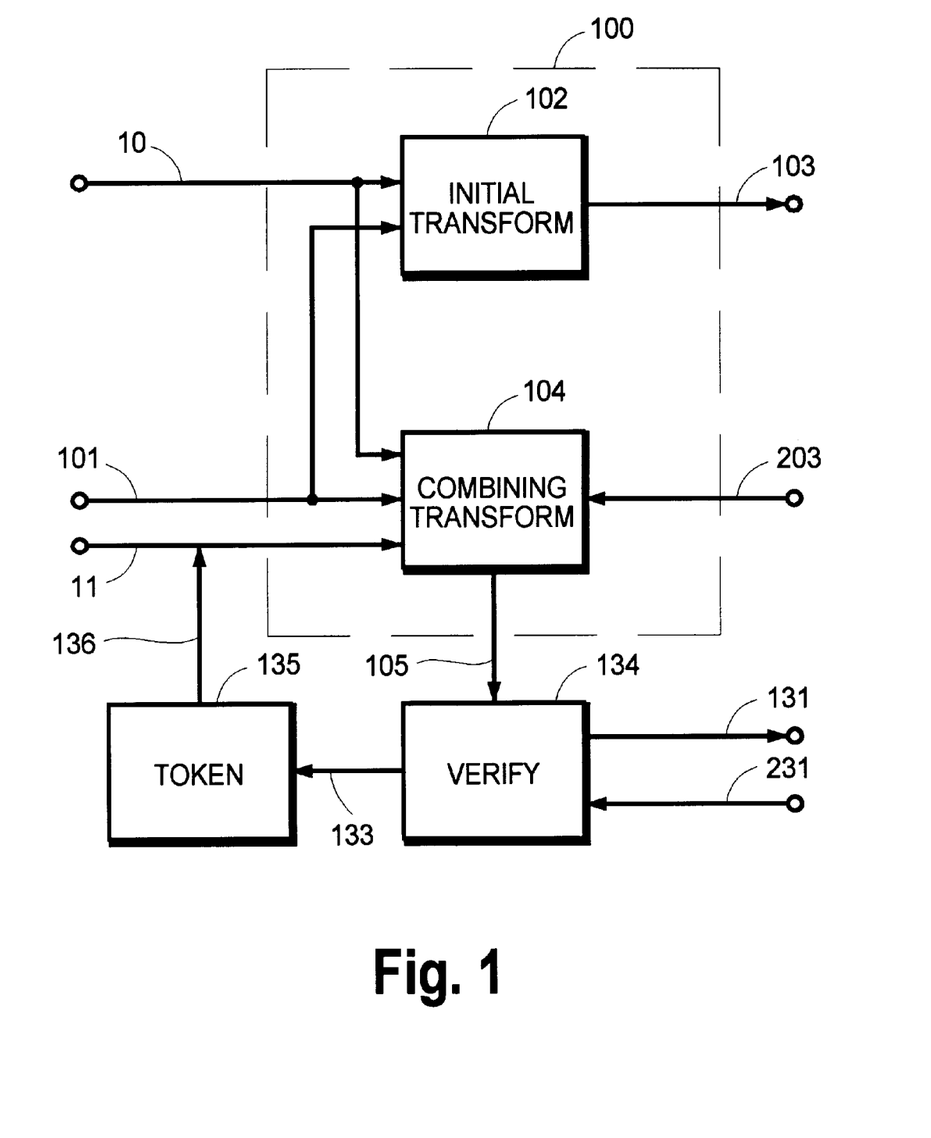
FIG. 1 illustrates a method or apparatus for a first participant in a protocol for establishing a shared secret with one or more second participants using an authentication factor.

FIG. 1 illustrates a method or apparatus for a first participant in a protocol for establishing a shared secret with a second participant using one or more authentication factors. Gen 100 of the method or apparatus comprises initial transformation 102 that generates first public signal 103 by transforming private signal 101 according to shared parameters 10, and combining transformation 104 that establishes shared secret 105 by transforming private signal 101, second public signal 203, and first authentication factor 11 according to shared parameters 10. First public signal 103 is sent to the second participant and second public signal 203 is received from the second participant. Gen 100 can be used in a protocol with a plurality of second participants by sending, either directly or indirectly, first public signal 103 to all second participants and by receiving and making available to combining transformation 104 the second public signals generated by all second participants.

Initial transformation 102 is infeasible to invert, meaning that it is essentially impossible to derive private signal 101 from first public signal 103 even if shared parameters 10 and the operations performed by the transformation are known. Preferably, private signal 101 is very difficult to guess. If this signal can be guessed and the shared parameters and initial transformation operations are available to an unauthorized party, shared secret 105 can be easily established by that unauthorized party.

An example of a suitable initial transformation is:

$$X = g^A \bmod(n) \quad (1)$$

where
X=the first public signal;
A=the private signal;
g,n=shared parameters; and
mod(n)=arithmetic modulo function.

In these examples, shared parameters g and n are common to all participants.

The degree of difficulty to invert the transformation is affected significantly by the choice of the shared parameters, g and n, where n is prime and g is primitive modulo n. For example, the difficulty of inversion is greater if n is a prime number and it further increases as the size of n increases. Preferably, n is a large prime number, say on the order of $10^{300}$ or more, but the size of n may be chosen to provide a degree of security commensurate with the value of the information that is to be protected. Other restrictions may be placed on the parameters as desired. For example, restricting n such that n−1 has a large prime factor or, ideally, such that ½.(n−1) itself is a prime number may further improve security. The parameter g should be chosen such that the distinct values g modulo n, $g^2$ modulo n, . . . $g^{n-1}$ modulo n, form a large subset of the integers 1 to n−1 or, ideally, form the complete set of integers 1 to n−1.

Combining transformation 104 is such that it is extremely difficult to generate the shared secret without access to a respective private signal for at least one participant in the protocol. For this particular implementation, combining transformation 104 is such that the generation of shared secret 105 is infeasible having access only to public signals 103 and 203, first authentication factor 11 and shared parameters 10. Further, combining transformation 104 is a function of the authentication factor, meaning that distinct values of shared secret 105 can be generated by varying only the first authentication factor 11. An example of a suitable combining transfornation is:

$$S = Y^{AK} \bmod(n) \quad (2a)$$

where
S=the established shared secret;
Y=the second public signal; and
K=the first authentication factor.

Another example of a suitable combining transformation is:

$$S = F[Y^A \bmod(n), K] \quad (2b)$$

where
F[t,u]=hash of t and u.

No particular hashing function is critical to practice of the present invention but, preferably, the hashing function should have the property that it is difficult to find two input values that hash to the same output value. One suitable hashing function is the Secure Hashing Algorithm (SHA) discussed in "Digital Signature Standard," National Institute of Standards and Technology FIPS PUB 186, U.S. Dept. of Commerce, May 1994. Another suitable hashing function is Message Digest 5 (MD5) discussed in R. L. Rivest, "The MD5 Message Digest Algorithm," RFC 1321, April 1992.

A scheme is used as necessary to expand or pad values to the appropriate block size for the hashing function. No particular scheme is critical to the practice of the present invention.

Various mathematical functions and operations may be incorporated into the combining transformation in a wide variety of ways such as, for example:

$$S = F[Y^{AK} \bmod(n), K] \quad (2c)$$

$$S = F[Y^A \bmod(n)] \oplus K \quad (2d)$$

where the symbol $\oplus$ denotes the Boolean exclusive-or function.

First authentication factor 11 is used to verify or authenticate the identity of one or more participants. Authentication can use evidence that is often classified into categories such as "what you know", "what you have", and "what you are". As discussed above, the knowledge of a password is an example of a "what you know" authentication factor. By producing an identity badge, a person provides an authentication factor from the "what you have" category. Stepping up to a device for a retinal scan is an example of providing an authentication factor from the "what you are" category. First authentication factor 11 can represent a single factor or some combination of multiple factors.

As discussed below, combining transformation 104 can use authentication factors in any combination of the categories. For example, FIG. 1 illustrates the use of "what you have" authentication factor 136 derived from token 135 in addition to first authentication factor 11, which could be in the "what you know" category. Tokens are discussed in more detail below. In another implementation, only one authentication factor such as a "what you are" authentication factor is used.

No particular implementation or type of authentication factor is critical to the practice of the present invention; however, security may be enhanced by using a combination of factors from multiple categories. In a portable computer, for example, a protocol could be implemented to require a "what you know" authentication factor such as a password in addition to a "what you have" authentication factor.

In general, the use of a "what you have" authentication factor evinces possession of a valid authenticating device. A simple form of a device that can provide a "what you have"

authenticating factor is a record of information such as a sheet of paper or a computer disk from which the factor can be derived.

The "what you have" authentication factor could also take the form of an authenticating token provided by a "token device." The term "token device" as used herein refers to any means for providing tokens including, but not limited to, special purpose hardware circuits and software or "firmware" executed by general purpose computers. The token device can be closed, generating a sequence of numbers that are infeasible to predict, or it can be open, generating a value in response to some input or seed value.

A token device can be implemented to generate the next token in response to information that is retained from a previous event such as the generation of the previous token or other information established during a communication session. That retained information is referred to herein as a "retained token."

If the method or apparatus illustrated in FIG. 1, using both "what you have" and "what you know" authentication factors, is implemented in a portable computer, for example, such a system retains at least some resistance to cryptanalytic attack even if the computer and all "what you have" authentication devices are stolen. Mere possession of the system is not sufficient to allow decryption of any messages previously sent or received by the computer, and it does not permit an unauthorized person to masquerade as an authorized party.

These advantages can be realized only if the authorized participant rightfully possessing the computer terminates any secure communication session before relinquishing direct supervision of the computer and the protocol is implemented in such a way that there is no residual record of the "what you know" authentication factor, the shared secret or the session key. For example, the implementation should ensure that any random access memory (RAM) used to store this information is erased and that the appropriate areas of RAM storing this information have not been written to disk such as in a paging or swap file. This further requires that the authorized participant not use "suspend" features (such as "suspend to RAM" or "suspend to disk") common in many portable computers while this sensitive information is still available in RAM.

After the shared secret 105 is established, it can be used in a variety of ways. For example, the shared secret can be used as the encryption/decryption key in a symmetric-key cryptosystem, as the keys in a public-key/private-key cryptosystem, as a value from which these keys can be derived, or it can be used to authenticate a participant or message content.

Verify 134 and token 135 represent use of shared secret 105 for authentication. For example, verify 134 exchanges one or more messages 131 for one or more messages 231 and tests the contents of, or information derived from, one or more messages 231 using shared secret 105. Authentication is achieved if the tests are passed successfully. Many authenticating tests are known. A protocol implementing a novel authenticating test is described below.

Figure 2:
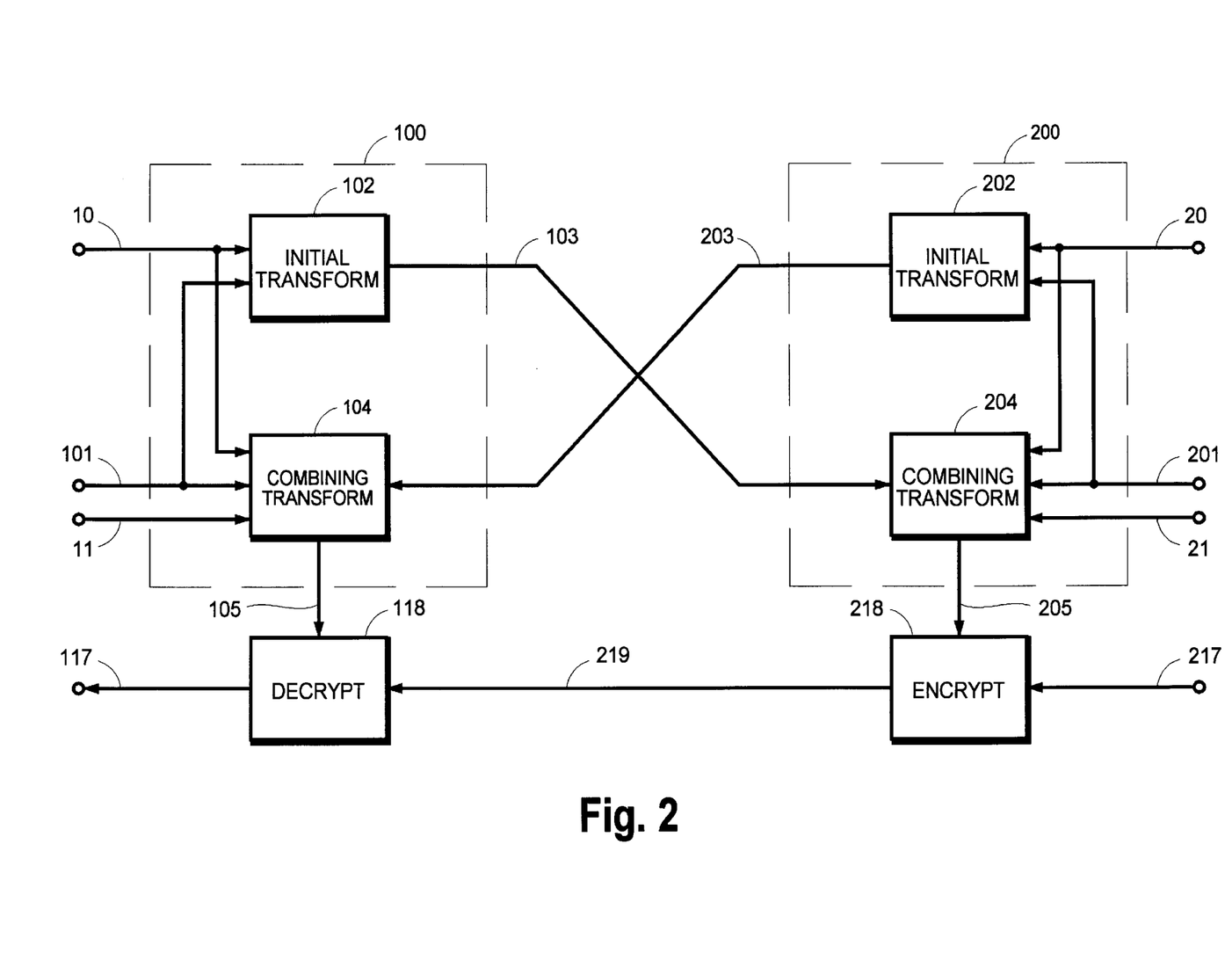
FIG. 2 illustrates a method or apparatus for a first participant and a second participant in a protocol for establishing a shared secret using an authentication factor.

FIG. 2 illustrates a method or apparatus for a first participant and a second participant in a protocol for establishing a shared secret using an authentication factor. Gen 100, discussed above, is similar to gen 200. Gen 200 comprises initial transformation 202 that generates second public signal 203 by transforming second private signal 201 according to shared parameters 20, and combining transformation 204 that establishes shared secret 205 by transforming second private signal 201, first public signal 103, and first authentication factor 21 according to shared parameters 20. As shown in the figure, the participants exchange public signals. In the examples discussed above, shared parameters 20 and shared parameters 10 are common parameters, i.e., they are equal, and first authentication factor 21 is equal to first authentication factor 11; however, in general, second private signal 201 is not equal to private signal 101, referred to in this implementation as first private signal 101.

If initial transformation 102 conforms to expression 1, for example, then initial transformation 202 could be:

$$Y=g^B \bmod(n) \tag{3}$$

where

Y=the second public signal; and

B=the second private signal.

If combining transformation 104 conforms to expression 2a, for example, combining transformation 204 could be:

$$S=X^{BK} \bmod(n). \tag{4a}$$

If combining transformation 104 conforms to expression 2b, combining transformation 204 could be:

$$S=F[X^B \bmod(n), K]. \tag{4b}$$

One or more authentication factors may be used. If more than one authentication factor is used in a method or apparatus as illustrated in FIG. 2, for example, the additional factors could be provided to combining transformation 104 and combining transformation 204 by additional signals passed along paths 11 and 21, respectively. Alternatively, the additional authentication factors could be provided by additional signals in a way not illustrated in the figure. A few examples of combining transformation 104 using multiple authentication factors are $$S=Y^{AKJH} \bmod(n) \tag{5a}$$

$$S=G[Y^A \bmod(n), K, J, H] \tag{5b}$$

$$S=F[Y^{AKJ} \bmod(n), H] \tag{5c}$$

and corresponding examples of combining transformation 204 are $$S=X^{BKJH} \bmod(n) \tag{6a}$$

$$S=G[X^B \bmod(n), K, J, H] \tag{6b}$$

$$S=F[X^{BJK} \bmod(n), H] \tag{6c}$$

where

K=a "what you know" authentication factor;

J=a "what you have" authentication factor;

H=another "what you have" authentication factor; and

G[t,u,v,w]=hash of t, u, v and w.

Encryption 218 and decryption 118 shown in FIG. 2 illustrate using the shared secret to encrypt and decrypt subsequent messages. Encrypt 218 generates ciphertext 219 by encrypting plaintext 217 according to shared secret 205, and decrypt 118 recovers plaintext 117 by decrypting ciphertext 219 according to shared secret 105.

Symmetric-key cryptosystems such as DES, Triple-DES and IDEA, for example, can use the shared secret to derive encryption/decryption keys to convert between blocks of plaintext and blocks of ciphertext. Preferably, either the input or the results of the encryption of one plaintext block is chained forward into the encryption process of the next plaintext block. The encryption of the very first block of plaintext is usually performed in the same way as that done for the remaining blocks with an "initialization vector" substituted for the data fed forward from a previous block. A chaining method may be designed so that the alteration of a single bit of the ciphertext renders that ciphertext block and all successive ciphertext blocks unintelligible to the receiver.

Figure 3:
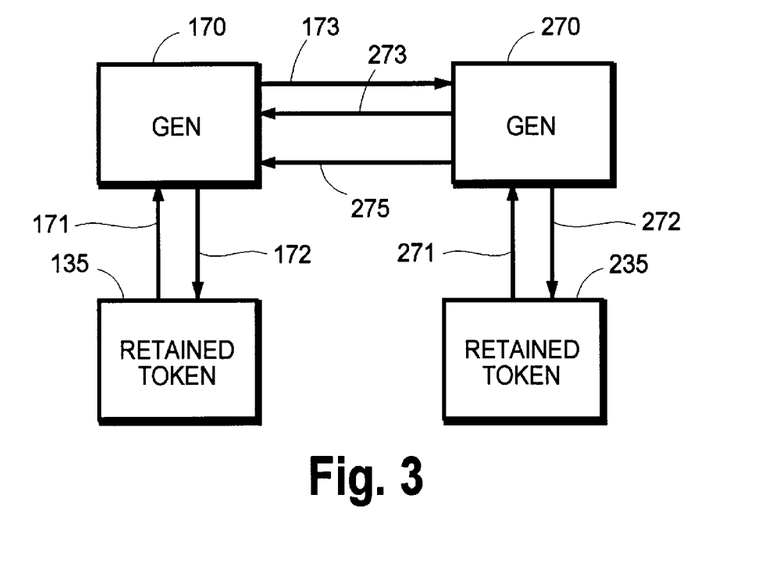
FIG. 3 illustrates a method or apparatus for a first participant and a second participant in a protocol for the second participant to detect prior occurrences of an authorized party masquerading as the first participant.

FIG. 3 illustrates a method or apparatus for a first participant and a second participant in a protocol for the second participant to detect prior occurrences of an unauthorized party successfully masquerading as the first participant. Gen 170 and gen 270 exchange one or more messages 173 and optionally one or more messages 273. Gen 170 generates at least one of messages 173 in response to retained token 135 in possession of the first participant. Gen 270 receives messages 173 and authenticates the first participant associated with retained token 235 in possession of the second participant by verifying one or more signals 173 with retained token 235. In response to a successful authentication, gen 270 generates notification signal 275 and updates retained token 235. Gen 170 receives notification signal 275 and, in response thereto, updates retained token 135 so as to permit successful authentication in the next communication session. The form or content of notification signal 275 is not critical. For example, a successful authentication may be expressly conveyed in or by a message or it may be implied by one or more subsequent messages that would not have been passed by the second participant had the authentication been unsuccessful.

In response to an unsuccessful verification, gen 270 may generate one or more signals that cause future communications to be restricted or prohibited with the participant associated with retained token 235. Alternatively or in addition to this, generated signals could notify an administrator of the failed authentication.

This method or apparatus provides for detection of a prior occurrence where an unauthorized participant successfully masquerades as an authorized participant. In response to the successful masquerade, retained token 235 is updated. The retained token in possession of the unauthorized participant can also be updated. The successful masquerade is detected when the authorized participant attempts to establish a communication session with the second participant but fails because retained token 135 in possession of the authorized first participant no longer has the correct value needed for successful authentication. As an added safety precaution, the second participant may also prevent or restrict future communications with any party appearing as the authorized first participant until another token known to be secure has been established for the authorized first participant.

This scheme can be extended to support multiple first participants. A first participant includes in at least one of messages 173 information identifying which first participant is attempting to establish a communication session. Retained token 235 represents a respective retained token and identifying information for each authorized first participant. For example, retained token 235 could represent a data base containing information that identifies each authorized participant and is associated with a respective retained token. Alternatively, one retained token could be used for a plurality of authorized participants; however, each of the plurality of authorized participants would have to be notified when and how to update the respective retained token.

Figure 4:
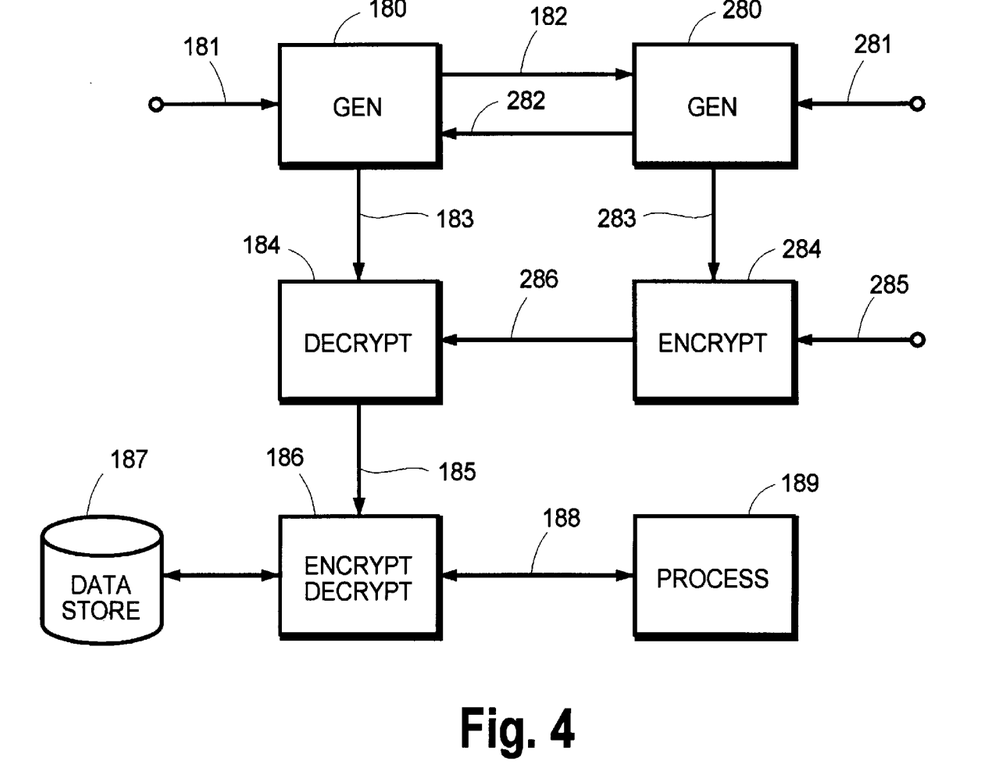
FIG. 4 illustrates a method or apparatus for a first participant and a second participant in a protocol for the first participant to obtain from the second participant a cryptographic key to use in encrypting and/or decrypting information stored on a computer for use on that computer.

FIG. 4 illustrates a method or apparatus for a first participant and a second participant in a protocol for the first participant to obtain from the second participant a cryptographic key to use in encrypting and/or decrypting information stored on a computer for use on that computer. Gen 180 and gen 280 exchange one or more messages 182 and optionally one or more messages 282. Gen 180 generates at least one of messages 182 in response to authentication factor 181 which is available to the first participant. Gen 280 receives messages 182 and identifies and authenticates the first participant by verifying signals 182 with authentication factor 281 available to the second participant. Various ways in which authentication may be carried out are discussed above. Another way is discussed below.

In response to successful authentication, the second participant generates one or more messages 286 in response to key value 285 which is associated with the first participant. Preferably, key value 285 is conveyed in an encrypted message prepared by encrypt 284 according to an encryption key derived at least in part from information passed in messages 182. Corresponding key value 185 is obtained by decrypt 184 decrypting the encrypted message according to a decryption key derived at least in part from information passed in messages 282. After the first participant obtains key value 185, process 189 processes plaintext 188 that is maintained on data store 187 in the form of ciphertext prepared by encrypt/decrypt 186 according to key value 185.

In this manner, the first participant is able to protect information stored on a computer such as a portable computer using a cryptographically strong key too random to be easily remembered and without compromising the strength of the key by recording it on materials carried with the computer. The only information that need be remembered is authentication factor 181 which can be, if necessary, much weaker cryptographically.

Resistance to dictionary attacks is maintained by requiring the active participation of an authorized participant to validate the "what you know" authentication factor. An off-line dictionary attack is not possible because it is not possible to determine whether a particular candidate or guess is correct without an exchange of messages with an authorized participant. Preferably, both the first participant and the second participant should tolerate only a limited number of unsuccessful attempts by another participant to pass authentication. When the limit is exceeded, all authorized participants should terminate the communication session.

In implementations where the second participant has a data base of cryptographically strong keys for a plurality of first participants, following a failed authentication attempt of a first participant, the second participant should restrict or prohibit communication sessions with that first participant until corrective action is taken.

In such an implementation, the second participant acts in a "server" role with each first participant acting in a "client" role. The security of the server data base is essential. Preferably, the server and the data base are physically inaccessible to all but those individuals required to maintain and operate them, thereby restricting interchange with the server through secure protocols according to the present invention using communications channels which need not be secure.

Various ways are discussed above which permit a party to authenticate or verify the identity of other parties. Preferably, authentication should satisfy two interests. First authentication should be reliable. Ideally, it should be impossible for an unauthorized party to successfully pass the authenticating tests. Second, messages exchanged to carry out the authentication should be resistant to cryptanalysis and man-in-the-middle attacks. Ideally, authentication should not "leak" or reveal information to any unauthorized party that can be exploited to reduce the security of the cryptosystem.

Unfortunately, authentication protocols that leak information can significantly reduce the security of any cryptosystem using cryptographically weak authentication factors like the "what you know" authentication factors discussed above. An example of a typical protocol is discussed in the following paragraphs to illustrate this weakness.

Referring to FIG. 2, an unauthorized party and an authorized party participate in a protocol using "what you know" and "what you have" authentication factors. Each party requires both authentication factors, a respective private signal and a public signal received from the other party to participate in the protocol and successfully pass authentication. In this example, the unauthorized party has obtained the "what you have" authentication factor in some manner such as stealing a portable computer from another authorized party or by obtaining information that permits generation of a valid "what you have" authentication factor. As a result, the unauthorized party lacks only the "what you know" authentication factor because the unauthorized party can easily generate a suitable private signal and the necessary public signal is provided by the authorized party.

When the unauthorized party masquerades as some other authorized party without knowing the "what you know" authentication factor, however, the shared-secret signals established by each participant probably do not represent a shared secret because the unauthorized party probably cannot successfully guess the "what you know" authentication factor. In this example, SU represents the spurious shared secret established by the unauthorized party and SA represents the spurious shared secret established by the authorized party.

A subsequent authentication protocol is used to determine whether the two parties have in fact established a shared secret. In this example, the unauthorized party will not be able to pass the authenticating tests and the authorized party can immediately terminate the protocol.

After establishing the spurious shared secret, the unauthorized party initiates the authentication protocol by generating a value L, encrypts L according to SU, denoted as $E_{SU}\{L\}$, to obtain ciphertext $Z_L = E_{SU}\{L\}$ and passes ciphertext $Z_L$ to the authorized party. The authorized party decrypts the ciphertext according to SA, denoted as $D_{SA}\{Z_L\}$, to obtain $M = D_{SA}\{Z_L\} = D_{SA}\{E_{SU}\{L\}\}$. If SU and SA were actually shared secrets, M would equal L; however, since SU and SA are spurious shared secrets, it is extraordinarily unlikely the two values will be equal. According to the authentication protocol, the authorized party obtains a value N by modifying the decrypted value in some known way such as, for example, by adding one, or N=M+1. The authorized party then generates a value V and encrypts the values N and V according to SA to obtain ciphertext $Z_N = E_{SA}\{N,V\}$ and passes the ciphertext $Z_N$ to the unauthorized party.

In a normal situation where both parties are authorized and SU and SA are actually shared secrets, the first (unauthorized) party could authenticate the second (authorized) party by decrypting the ciphertext $Z_N$ according to SU to obtain N and V. By comparing the decrypted value N with the value L+1, the first party could authenticate the second party. The first party would continue the protocol, obtaining a value W by modifying the decrypted value V in some way such as, for example, adding one or W=V+1, encrypting the value W according to SU to obtain ciphertext $Z_W = E_{SU}\{W\}$, and passing the ciphertext $Z_W$ to the second participant. The second participant would decrypt the ciphertext according to SA and compare the decrypted value with V+1 to authenticate the first participant.

In this example, however, the unauthorized party terminates the protocol after receiving the ciphertext $Z_N$ and commences an off-line dictionary attack on the ciphertext. The attack comprises guessing a trial authentication factor for the "what you know" authentication factor and using the available "what you have" authentication factor, respective private signal and public signal to generate a trial shared secret ST. If the "what you know" authentication factor has been guessed correctly, the unauthorized party can use the trial secret ST to successfully recreate the pertinent parts of ciphertext $Z_N$ received from the authorized party. More specifically, the unauthorized party can test each trial secret ST by decrypting $Z_L$ according to $D_{ST}\{Z_L\}$, modifying the resulting value in the known way, for example, by adding one to obtain a value O, choosing some arbitrary value Q to represent V, encrypting the result according to ST to obtain ciphertext $Z_O = E_{ST}\{O,Q\}$, and using the mathematical and statistical properties of the authentication protocol in comparing $Z_O$ with $Z_N$ to determine if the trial secret ST is correct. When a successful comparison is made for some trial secret ST, it is extremely likely that the corresponding trial authentication factor is the desired "what you know" authentication factor.

This attack is generally feasible because "what you know" authentication factors that are easy to remember are generally vulnerable to a dictionary attack and mathematical and statistical properties of the authentication protocol make an off-line attack possible.

Figure 5:
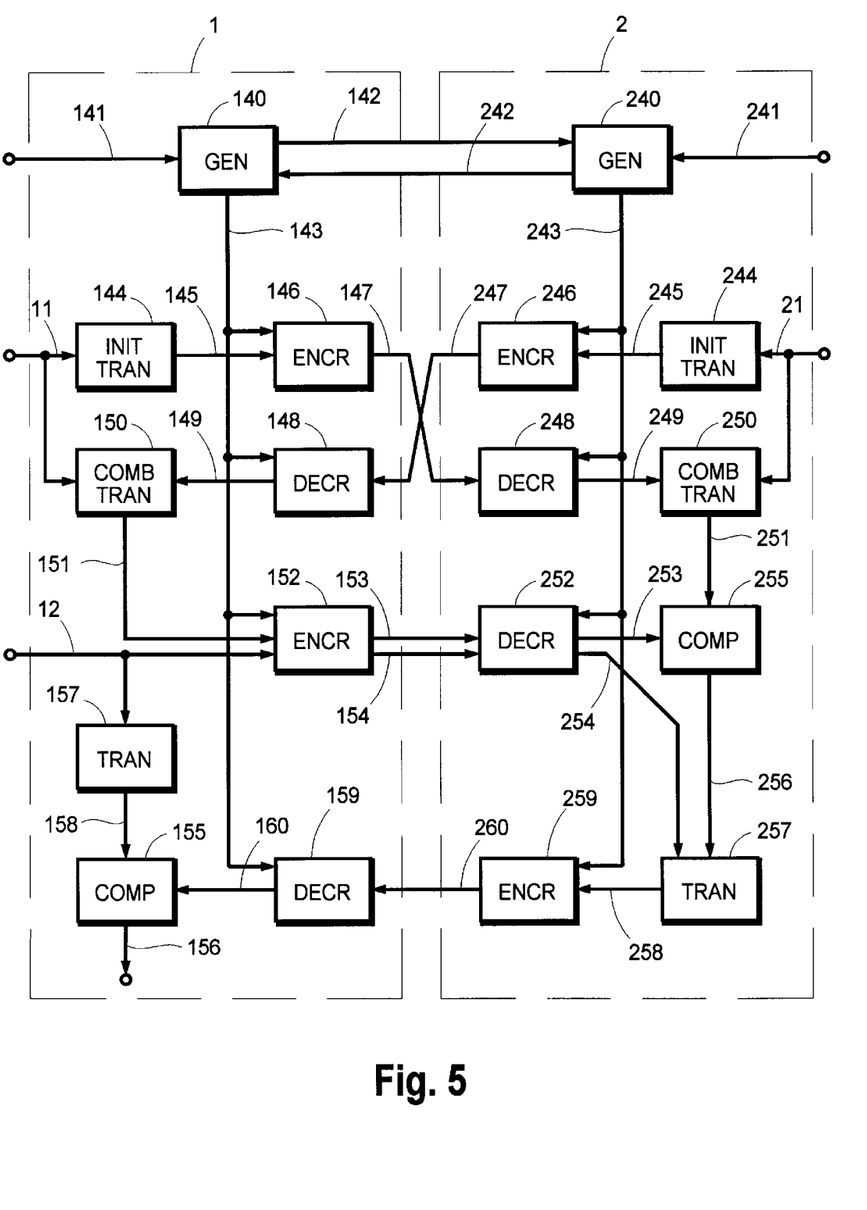
FIG. 5 illustrates a method or apparatus for a first participant and a second participant in a protocol for each participant to authenticate the other participant.

FIG. 5 illustrates a method or apparatus for a first participant and a second participant in an authentication protocol that overcomes the problems discussed above. Although this authentication protocol is well suited for use with public-signal key-establishment protocols like those discussed above, it can be used with essentially any technique that establishes a shared secret. For example, authentication can be carried out for shared secrets established confidentially in advance or from confidential information carried by courier. For ease of discussion, however, the example discussed below assumes a symmetric-key cryptosystem in which shared secrets are established by a public-signal key-establishment protocol such as those discussed above.

An authentication protocol between participant 1 and participant 2 that thwarts both dictionary and man-in-the-middle attacks is described in the following paragraphs. Referring to FIG. 5, gen 140 and gen 240 establish secret signals 143 and 243, respectively, in response to signals 141 and 241 and public signals 142 and 242. If gen 140 implements the Diffie-Hellman protocol discussed above, for example, signal 242 represents the public signal and signal 141 represents the common parameters and private signal required by the Diffie-Hellman transformations. If gen 140 implements the initial and combining transformations shown in expressions 1 and 2a, signal 141 represents common parameters {g,n}, a private signal A and an authentication factor K, and signal 242 represents public signal Y. If gen 140 and gen 240 merely provide a shared secret agreed to in advance, signals 141, 142, 241 and 242 are not required.

Using initial transformation 144, participant 1 generates transformed signal 145 by transforming private signal 11. Initial transformation 144 should be infeasible to invert. Encrypt 146 generates public signal 147 by encrypting signal 145 according to secret signal 143.

Using initial transformation 244, participant 2 generates transformed signal 245 by transforming private signal 21. Encrypt 246 generates public signal 247 by encrypting signal 245 according to secret signal 243.

Decrypt 148 receives public signal 247 and generates decrypted signal 149 by decrypting public signal 247 according to secret signal 143. If encrypt 246 and decrypt 148 are part of a symmetric-key cryptosystem and secret signal 143 is equal to secret signal 243, decrypted signal 149 will be equal to transformed signal 245; however, if secret signal 143 is not equal to secret signal 243, it is extremely unlikely that decrypted signal 149 will be equal to transformed signal 245. The notion that two signals are "equal" means that the information represented by the two signals are the same or are equivalent.

In a similar manner, decrypt 248 receives public signal 147 and generates decrypted signal 249 by decrypting public signal 147 according to secret signal 243.

Combining transformation 150 generates transformed signal 151 by transforming private signal 11 with decrypted signal 149. Combining transformation 150 should be infeasible to invert.

In a similar manner, combining transformation 250, generates transformed signal 251 by transforming private signal 21 with decrypted signal 249.

If decrypt 148 and decrypt 248 both successfully recover the encrypted information from the respective public signals, transformed signal 151 is equal to transformed signal 251. This equality authenticates each participant but neither participant has enough information at this point in the protocol to determine that the two signals are equal. The remainder of the protocol provides a way for this equality to be communicated to each participant.

Encrypt 152 generates public signals 153 and 154 by encrypting transformed signal 151 and private signal 12, respectively, according to secret signal 143. Alternatively, as described below for example, signals 153 and 154 may represent two components of a single public signal.

Decrypt 252 generates decrypted signals 253 and 254 by decrypting public signals 153 and 154, respectively, according to secret signal 243. If decrypt 252 successfully decrypts public signals 153 and 154, decrypted signal 253 is equal to transformed signal 151 and decrypted signal 254 is equal to private signal 12. Compare 255 compares transformed signal 251 with decrypted signal 253 and generates authentication signal 256 indicating whether the two signals are equal. If the signals are equal, the identity of participant 1 is authenticated to participant 2. Participant 2 continues the protocol to authenticate itself to participant 1. If the signals are not equal, however, the identity of participant 1 is not authenticated and participant 2 terminates the protocol.

If authentication signal 256 indicates the compared signals are equal, transformation 257 generates transformed signal 258 by transforming decrypted signal 254. Encrypt 259 generates public signal 260 by encrypting transformed signal 258 according to secret signal 243.

Transform 157, which is essentially identical to transformation 257, generates transformed signal 158 by transforming private signal 12.

Decrypt 159 generates decrypted signal 160 by decrypting public signal 260 according to secret signal 143.

Compare 155 compares transformed signal 158 with decrypted signal 160 and generates authentication signal 156 indicating whether the two signals are equal. If the signals are equal, the identity of participant 2 is authenticated to participant 1. Participant 1 may continue the communication session with participant 2 as desired. If the signals are not equal, however, the identity of participant 2 is not authenticated and participant 1 terminates the protocol.

The ciphertext of public signals 147, 247, 153, 154 and 260 provide very little information for cryptanalysis and is resistant to man-in-the-middle attacks.

If participant 2 is an unauthorized participant, the ciphertext of public signals 147, 153 and 154 resists cryptanalysis including dictionary attacks because the corresponding plaintext is essentially a random number and the correctness of a guess cannot be determined without the participation of an authorized party.

If participant 1 is an unauthorized participant, the ciphertext of public signal 247 also resists cryptanalysis for similar reasons. The ciphertext of public signal 260 would be more vulnerable to cryptanalysis because participant 1 can control the plaintext of private signal 12 which is subsequently decrypted, transformed and encrypted by participant 2; however, this vulnerability cannot be exploited because participant 2 terminates the protocol before sending public signal 260 if the identity of participant 1 is not authenticated.

An example of the authentication protocol discussed above is described in the following steps. The shared secret S described in the example corresponds to secret signals 143 and 243; that is, secret signal 143 and secret signal 243 are both equal to S. The steps proceed as follows:

1. A first participant and a second participant establish shared secret S. If a public-signal key-establishment protocol uses two authentication factors such as a "what you know" authentication factor K and a "what you have" authentication factor J, for example, a protocol according to transformations discussed above could be used to establish the shared secret as follows:

a) The first participant sends to the second participant public signal X obtained from initial transformation $X=g^A \mod(n)$.

b) The second participant sends to the first participant public signal Y obtained from initial transformation $Y=g^B \mod(n)$.

c) The first participant obtains shared secret S from combining transformation $S=Y^{AKJ} \mod(n)$.

d) The second participant obtains shared secret S from combining transformation $S=X^{BKJ} \mod(n)$.

2. The first participant generates a transformed signal $X_C$ from an initial transformation of a private signal C not available to the second participant, encrypts signal $X_C$ according to shared secret S, and passes the resulting ciphertext $Z_C$ in a public signal to the second participant. For example, $X_C=g^C \mod(n)$ and $Z_C=E_S\{X_C\}$, where $E_S\{x\}$ represents encryption of x according to key S.

3. The second participant generates a transformed signal $Y_D$ from an initial transformation of a private signal D not available to the first participant, encrypts signal $Y_D$ according to shared secret S, and passes the resulting ciphertext $Z_D$ in a public signal to the first participant. For example, $Y_D=g^D \mod(n)$ and $Z_D=E_S\{Y_D\}$.

4. Using shared secret S, the first participant decrypts ciphertext $Z_D$ to obtain plaintext $Y_D$, and generates a value T from a combining transformation of C and $Y_D$. For example, $Y_D=D_S\{Z_D\}$ and $T=Y_D^C \mod(n)$, where $D_S\{X\}$ represents decryption of x according to key S. If the first and second participants have not established a shared secret S, it is extremely unlikely that the first participant could successfully obtain plaintext $Y_D$ from ciphertext $Z_D$.

5. The first participant obtains another private signal L, encrypts both T and L according to shared secret S, and passes the resulting ciphertext $Z_L$ in a public signal to the second participant. For example, $Z_L=E_S\{T,L\}$.

6. Using shared secret S, the second participant decrypts ciphertext $Z_C$ to obtain plaintext $X_C$, generates a value U from a combining transformation of D and $X_C$, obtains T and L by decrypting ciphertext $Z_L$ according to shared secret S, and compares the value of T with the value of U to authenticate the first participant. For example, $X_C=D_S\{Z_C\}$, $U=X_C^D \mod(n)$ and $\{T,L\}=D_S\{Z_L\}$. If the first and second participants have established a shared secret S, the second participant can successfully obtain plaintext $X_C$ from ciphertext $Z_C$ and can successfully obtain T from ciphertext $Z_L$. In this situation, the decrypted value of T is equal to the value of U. If the first and second participants have not established a shared secret S, however, it is extremely unlikely that the second participant can successfully obtain plaintext $X_C$ or the value T from respective ciphertext. In this situation, it is extremely unlikely that the decrypted value of T will equal the value of U; therefore, a test for equality between the two values is an extremely reliable authentication test.

7. Assuming T equals U, thereby authenticating the first participant, the second participant generates a value M from L using a transformation known to the first participant, encrypts M according to shared secret S, and passes the resulting ciphertext $Z_M$ in a public signal to the first participant. For example, $M=L+1$ and $Z_M=E_S\{M\}$.

8. Using shared secret S, the first participant decrypts ciphertext $Z_M$ to obtain M, and determines whether M agrees with the known transformation of L. For example, $M=D_{S\{ZM\}}$. In this example, if the decrypted value M is equal to the value of L+1, the second participant is authenticated. If the second participant is not an authorized party, however, the second participant would not have been able to successfully obtain the value for L by decrypting the ciphertext $Z_L$; therefore, it is extremely unlikely that the decrypted value corresponding to M that the first participant obtained from the ciphertext $Z_M$ will equal the value L+1. A test for equality between the two values is an extremely reliable authentication test.

We claim:

1. In a cryptographic protocol for a first participant and one or more second participants, a method for said first participant to establish a shared secret with said second participants, said first participant and said second participants sharing a first authentication factor, said method comprising the steps of:

receiving a private signal, generating a first public signal by obtaining an initial transformation of said private signal using shared parameters shared with said second participants, receiving a respective second public signal from each of said second participants, sending said first public signal to at least one of said second participants, and generating a shared-secret signal representing said shared secret by obtaining a combining transformation of said private signal with said second public signals and said first authentication factor using said shared parameters, said combining transformation having a property that distinct values of said shared-secret signal are generated by varying only said first authentication factor, wherein the steps of said method are performed in any order such that all signals required by a respective step are available when said respective step is performed.

2. A method according to claim 1 that further comprises decrypting said second public signal using a decryption key derived at least in part from said first authentication factor.

3. A method according to claim 1 wherein
   said shared parameters comprise a first number and a second number,
   said initial transformation includes a function equivalent to raising said first number to a first power represented by said private signal, modulo said second number, and
   said combining transformation includes a function equivalent to raising number represented by said second public signal to a second power representing said private signal, modulo said second number.

4. A method according to claim 3 wherein said second power also represents said first authentication factor.

5. A method according to claim 3 wherein said combining transformation includes a hashing function.

6. A method according to claim 3 wherein said combining transformation includes a hashing function.

7. A method according to claim 1 wherein said combining transformation is also of a second authentication factor shared by said first participant and said second participants, said combining transformation having a property that distinct values of said shared-secret signal are generated by varying only said second authentication factor.

8. A method according to claim 7 wherein
   said shared parameters comprise a first number and a second number,
   said initial transformation includes a function equivalent to raising said first number to a first power represented by said private signal, modulo said second number, and
   said combining transformation includes a function equivalent to raising a number represented by said second public signal to a second power representing said private signal, modulo said second number.

9. A method according to claim 8 wherein said second power also represents said first authentication factor and said second authentication factor.

10. A method according to claim 1 further comprising the steps of:

said first participant receiving a second private signal, said first participant generating a first transformed signal by obtaining a first transformation of said second private signal, first participant generating a third public signal by encrypting said first transformed signal according to said shared secret, said first participant receiving a fourth public signal, said first participant obtaining a first decrypted signal by decrypting said fourth public signal according to said shared secret, said first participant generating a second transformed signal by obtaining a second transformation of said second private signal with said first decrypted signal, said first participant receiving a third private signal, said first participant generating one or more fifth public signals by encrypting said second transformed signal and said third private signal according to said shared secret, said first participant obtaining a third transformed signal by transforming said third private signal, said first participant receiving a sixth public signal, said first participant obtaining a second decrypted signal by decrypting said sixth public signal according to said shared secret, and said first participant comparing said third transformed signal with said second decrypted signal and generating an authentication signal in response thereto, wherein the steps of said method are performed in any order such that all signals required by a respective step are available when said respective step is performed.

11. A method according to claim 1 further comprising the steps of:

said first participant receiving a second private signal, said first participant generating a first transformed signal by obtaining a first transformation of said second private signal, said first participant generating a third public signal by encrypting said first transformed signal according to said shared secret, said first participant receiving a fourth public signal, said first participant obtaining a first decrypted signal by decrypting said fourth public signal according to said shared secret, said first participant generating a second transformed signal by obtaining a second transformation of said second private signal with said first decrypted signal, said first participant receiving a fifth public signal, said first participant obtaining a second decrypted signal by decrypting said fifth public signal according to said shared secret, and said first participant comparing said second decrypted signal with said second transformed signal and generating an authentication signal in response thereto, wherein the steps of said method are performed in any order such that all signals required by a respective step are available when said respective step is performed.

12. A medium readable by a machine embodying a program of instructions executable by said machine to perform a method in a cryptographic protocol, said method comprising the steps of claim 1.

13. In a cryptographic protocol for a plurality of participants, a method for a first participant to establish a shared secret with a second participant, said first participant and said second participant sharing a first authentication factor, said method comprising the steps of:

said first participant receiving a first private signal, said second participant receiving a second private signal, said first participant generating a first public signal by obtaining a first initial transformation of said first private signal using shared parameters shared with said second participants, said second participant generating a second public signal by obtaining a second initial transformation of said second private signal using said shared parameters, said first participant receiving said second public signal, said second participant receiving said first public signal, said first participant generating a first shared-secret signal representing said shared secret by obtaining a first combining transformation of said first private signal with said second public signal and said first authentication factor using said shared parameters, said first combining transformation having a property that distinct values of said first shared-secret signal are generated by varying only said first authentication factor, and said second participant generating a second shared-secret signal representing said shared secret by obtaining a second combining transformation of said second private signal with said first public signal and said first authentication factor using said shared parameters, said second combining transformation having a property that distinct values of said second shared-secret signal are generated by varying only said first authentication factor, wherein the steps of said method are performed in any order such that all signals required by a respective step are available when said respective step is performed.

14. A method according to claim 13 that further comprises decrypting said second public signal using a decryption key derived at least in part from said first authentication factor.

15. A method according to claim 13 wherein said shared parameters comprise a first number and a second number, said first initial transformation includes a function equivalent to raising said first number to a first power represented by said first private signal, modulo said second number, said second initial transformation includes a function equivalent to raising said first number to a second power represented by said second private signal, modulo said second number, said first combining transformation includes a function equivalent to raising a number represented by said second public signal to a third power representing said first private signal, modulo said second number, and said second combining transformation includes a function equivalent to raising a number represented by said first public signal to a fourth power representing said second private signal, modulo said second number.

16. A method according to claim 15 wherein said third power also represents said first authentication factor and said fourth power also represents said first authentication factor.

17. A method according to claim 15 wherein said first combining transformation includes a hashing function and said second combining transformation includes a hashing function.

18. A method according to claim 13 wherein said first combining transformation is also of a second authentication factor shared by said first participant and said second participant, said second combining transformation is also of said second authentication factor, and said first and second combining transformations each have a property that distinct values of said shared-secret signal are generated by varying only said second authentication factor.

19. A method according to claim 18, wherein said shared parameters comprise a first number and a second number, said first initial transformation includes a function equivalent to raising said first number to a first power represented by said first private signal, modulo said second number, said second initial transformation includes a function equivalent to raising said first number to a second power represented by said second private signal, modulo said second number, said first combining transformation includes a function equivalent to raising a number represented by said second public signal to a third power representing said first private signal, modulo said second number, and said second combining transformation includes a function equivalent to raising a number represented by said first public signal to a fourth power representing said second private signal, modulo said second number.

20. A method according to claim 19 wherein said third power also represents said first authentication factor and said second authentication factor, and said fourth power also represents said first authentication factor and said second authentication factor.

21. A method according to claim 1, 7, 13, or 18 further comprising said first participant obtaining an established cryptographic key associated with said first participant by receiving and decrypting a message from another of said participants, said decrypting proceeding according to said shared secret.

22. A method according to claim 13 further comprising the steps of:

said first participant receiving a third private signal, said second participant receiving a fourth private signal, said first participant generating a first transformed signal by obtaining a first transformation of said third private signal, said second participant generating a second transformed signal by obtaining a second transformation of said fourth private signal, first participant generating a third public signal by encrypting said first transformed signal according to said first shared-secret signal, said second participant generating a fourth public signal by encrypting said second transformed signal according to said second shared-secret signal, said first participant receiving said fourth public signal, said second participant receiving said third public signal, said first participant obtaining a first decrypted signal by decrypting said fourth public signal according to said first shared-secret signal, said second participant obtaining a second decrypted signal by decrypting said third public signal according to said second shared-secret signal, said first participant generating a third transformed signal by obtaining a third transformation of said third private signal with said first decrypted signal, said second participant generating a fourth transformed signal by obtaining a fourth transformation of said fourth private signal with said second decrypted signal, said first participant receiving a fifth private signal, said first participant generating one or more fifth public signals comprising a first encrypted element and a second encrypted element by encrypting said third transformed signal and said fifth private signal, respectively, according to said first shared-secret signal, said second participant receiving said one or more fifth public signals and obtaining one or more third decrypted signals comprising a first decrypted element and a second decrypted element, said first decrypted element and said second decrypted element obtained by decrypting said first encrypted element and said second encrypted element, respectively, according to said second shared-secret signal, said second participant comparing said first decrypted element with said fourth transformed signal and, if equal, generating a sixth public signal by encrypting a fifth transformed signal according to said second shared-secret signal, said fifth transformed signal obtained by transforming said second decrypted element, said first participant receiving said sixth public signal, said first participant obtaining a fourth decrypted signal by decrypting said sixth public signal according to said first shared-secret signal, said first participant obtaining a sixth transformed signal by transforming said fifth private signal, and said first participant comparing said fourth decrypted signal with said sixth transformed signal, wherein the steps of said method are performed in any order such that all signals required by a respective step are available when said respective step is performed.

23. A method according to claim 13 that further comprises decrypting said first public signal using a decryption key derived at least in part from said first authentication factor.

24. In a cryptographic protocol for a first participant and a second participant, a method for detecting a prior occurrence of an unauthorized party masquerading as said first participant, said method comprising the steps of:

said first participant generating one or more signals in response to a first retained token in possession of said first participant;

said second participant receiving said signals and authenticating said first participant by verifying said signals with a second retained token in possession of said second participant;

said second participant generating a first notification signal and updating said second retained token in response to a successful verification of said signals, and restricting future communications with said first participant in response to an unsuccessful verification of said signals; and said first participant receiving said first notification signal and, in response thereto, updating said first retained token to permit successful verification in future communications with said second retained token as updated by said second participant.

25. In a cryptographic protocol for a first participant and a second participant, a method for said first participant to obtain a key, said first participant and said second participant sharing an authentication factor, said method comprising the steps of:

said first participant generating one or more signals in response to said authentication factor;

said second participant receiving said signals and, in response thereto, authenticating said first participant using said authentication factor;

said second participant generating a message in response to a value associated with said first participant;

said first participant receiving said message and deriving said key in response thereto; and said first participant using said key to encrypt or decrypt information stored on a computer for use on said computer.

26. In a cryptographic protocol, an authentication method comprising the steps of:

receiving a first private signal, generating a first transformed signal by obtaining a first transformation of said first private signal, generating a first public signal by encrypting said first transformed signal according to a key, receiving a second public signal, obtaining a first decrypted signal by decrypting said second public signal according to said key, generating a second transformed signal by obtaining a second transformation of said first private signal with said first decrypted signal, receiving a second private signal, generating one or more third public signals by encrypting said second transformed signal and said second private signal according to said key, obtaining a third transformed signal by transforming said second private signal according to said key, receiving a fourth public signal, obtaining a second decrypted signal by decrypting said fourth public signal according to said key, and comparing said third transformed signal with said second decrypted signal and generating an authentication signal in response thereto, wherein the steps of said method are performed in any order such that all signals required by a respective step are available when said respective step is performed.

27. In a cryptographic protocol, an authentication method comprising the steps of:

receiving a first private signal, generating a first transformed signal by obtaining a first transformation of said first private signal, generating a first public signal by encrypting said first transformed signal according to a key, receiving a second public signal, obtaining a first decrypted signal by decrypting said second public signal according to said key, generating a second transformed signal by obtaining a second transformation of said first private signal with said first decrypted signal, receiving a third public signal, obtaining a second decrypted signal by decrypting said third public signal according to said key, comparing said second decrypted signal with said second transformed signal and generating an authentication signal in response thereto, wherein the steps of said method are performed in any order such that all signals required by a respective step are available when said respective step is performed.

28. In a cryptographic protocol, a method for a first participant and a second participant to authenticate one another, said method comprising the steps of:

said first participant receiving a first private signal, said second participant receiving a second private signal, said first participant generating a first transformed signal by obtaining a first initial transformation of said first private signal, said second participant generating a second transformed signal by obtaining a second initial transformation of said second private signal, said first participant generating a first public signal by encrypting said first transformed signal according to a first key, said second participant generating a second public signal by encrypting said second transformed signal according to a second key, said first participant receiving said second public signal, said second participant receiving said first public signal, said first participant obtaining a first decrypted signal by decrypting said second public signal according to said first key, said second participant obtaining a second decrypted signal by decrypting said first public signal according to said second key, said first participant generating a third transformed signal by obtaining a first combining transformation of said first private signal with said first decrypted signal, said second participant generating a fourth transformed signal by obtaining a second combining transformation of said second private signal with said second decrypted signal, said first participant receiving a third private signal, said first participant generating one or more third public signals comprising a first encrypted element and a second encrypted element by encrypting said third transformed signal and said third private signal, respectively, according to said first key, said second participant receiving said one or more third public signals and obtaining one or more third decrypted signals comprising a first decrypted element and a second decrypted element, said first decrypted element and said second decrypted element obtained by decrypting said first encrypted element and said second encrypted element, respectively, according to said second key, said second participant comparing said first decrypted element with said fourth transformed signal and, if equal, generating a fourth public signal by encrypting a fifth transformed signal according to said second key, said fifth transformed signal obtained by transforming said second decrypted element, said first participant receiving said fourth public signal, said first participant obtaining a fourth decrypted signal by decrypting said fourth public signal according to said first key, said first participant obtaining a sixth transformed signal by transforming said third private signal, and said first participant comparing said fourth decrypted signal with said sixth transformed signal, wherein the steps of said method are performed in any order such that all signals required by a respective step are available when said respective step is performed.

* * * * *